United States Patent Office 3,454,672
Patented July 8, 1969

3,454,672
CHLORINATED POLYESTERS
Winston Jerome Jackson, Jr., and John R. Caldwell,
Kingsport, Tenn., assignors to Eastman Kodak
Company, Rochester, N.Y., a corporation of New
Jersey
No Drawing. Continuation-in-part of application Ser. No.
346,125, Feb. 20, 1964. This application Nov. 29, 1967,
Ser. No. 686,740
Int. Cl. C08g 17/14, 17/02, 53/16
U.S. Cl. 260—860          14 Claims

ABSTRACT OF THE DISCLOSURE

Polyester fibers and films having improved resistance to burning are prepared by chlorinating the surfaces of said fibers and films.

---

This application is a continuation-in-part of Jackson and Caldwell U.S. Ser. No. 346,125, filed Feb. 20, 1964 now U.S. Patent 3,356,631.

This invention relates to chlorinated polyesters. In particular, it relates to chlorinating the surfaces of polyester shaped articles, such as fibers and films.

Fibers and films having improved resistance to burning are becoming of increasing importance in numerous applications. The advantages of fire-resistant or self-extinguishing wearing apparel, draperies, rugs, and coatings are obvious.

It is an object of this invention to provide chlorinated polyesters. It is a further object of this invention to chlorinate the surfaces of polyester fibers and polyester films. It is a further object of this invention to provide polyester fibers and films having improved resistance to burning. It is a still further object of this invention to provide polyester fibers and films which are self-extinguishing. It is a still further object of this invention to provide a process for obtaining chlorinated polyester fibers and films having improved resistance to burning. Other objects of this invention will appear herein.

These and other objects are accomplished by the practice of this invention, at least one embodiment of which comprises providing a fiber or film consisting essentially of a highly polymeric, linear polyester derived from (A) carbonic acid, a bifunctional hydroxycarboxylic acid, or a bifunctional dicarboxylic acid and (B) a bifunctional diol, wherein the surface of said fiber or film contains chlorine, the amount of chlorine being at least about two percent of the weight of said fiber or film and the chlorine being attached to carbon atoms which are attached only to carbon or hydrogen atoms.

Another embodiment of this invention through which the above objects are accomplished comprises providing a process for chlorinating a fiber or film consisting essentially of a highly polymeric, linear polyester derived from (A) carbonic acid, a bifunctional hydroxycarboxylic acid, or a bifunctional dicarboxylic acid and (B) a bifunctional diol, said process comprising contacting, at a temperature between about room temperature and about 150° C., said fiber or film with a chlorinating agent in the presence of a chlorination promoter, whereby the surface of said fiber or film is chlorinated, the amount of chlorine being at least about two percent of the weight of said fiber or film and the chlorine being attached to carbon atoms which are attached only to carbon or hydrogen atoms.

It is very surprising that improved resistance to burning results when the polyester fiber and film contain only about two percent by weight (based on the weight of the fiber or film) of chlorine attached to surface carbon atoms. In addition, only about three to five percent chlorine is required to make one-mil films and three-denier fibers self-extinguishing. In contrast, when the polyester is chlorinated throughout and not just substantially on the surface, then, depending upon the polyester structure, about 20 to 30 percent chlorine is required to make films and fibers self-extinguishing.

Our invention, therefore, constitutes a new concept— a relatively small amount of chlorine attached to the surface of polyester films and fabrics is effective in imparting fire-retardant characteristics. Since the chlorine is attached substantially to the surface, there is only a relatively small effect on the tensile properties. When crystallinity is present, the interior of the films and fibers remains crystalline, and the tensile and textile properties, therefore, are maintained. In contrast, when a crystallizable polyester is chlorinated throughout, it may lose its ability to be crystallized. Also, it tends to become susceptible to solvents.

The process of this invention comprises simply the chlorination of the surface of polyester fibers and films. The term "fibers" includes filaments, staple fibers, yarns, fabrics, and tricots. The term "films" includes self-supporting films and coatings.

The term "polyester" as used in this application includes polycarbonates and applies to polyesters (including both homopolyesters and copolyesters) which contain hydrogen atoms attached to non-aromatic carbon atoms which are attached only to carbon or hydrogen atoms. The reason for this limitation is because aromatic hydrogen atoms and hydrogen on carbon attached to oxygen are displaced to only a relatively small extent under the chlorination conditions used. Poly(ethylene terephthalate) fibers and films, for instance, are not chlorinated to a sufficient degree under our reaction conditions to become self-extinguishing.

The polyesters of this invention are high molecular weight polyesters derived from (A) carbonic acid, a bifunctional hydroxycarboxylic acid, or a bifunctional dicarboxylic acid and (B) a bifunctional diol. The term "carbonic acid" includes derivatives thereof, such as phosgene, bromophosgene, diethyl carbonate, and diphenyl carbonate. Examples of suitable difunctional hydroxycarboxylic acids are those having up to 40 carbon atoms, such as p-hydroxybenzoic, p-hydroxymethylbenzoic, and hydroxypivalic acids.

Suitable dicarboxylic acids are aliphatic, alicyclic, and aromatic dicarboxylic acids. Examples of such acids include oxalic; malonic; dimethylmalonic; succinic; glutaric; adipic; 2-methyl adipic; trimethyl adipic; pimelic; 2,2-dimethylglutaric; 3,3 - diethylsuccinic; azelaic; sebacic; suberic; fumaric; maleic; itaconic; 1,2-cyclopentanedicarboxylic; 1,3-cyclopentanedicarboxylic; 1,2-cyclohexanedicarboxylic; 1,3-cyclohexanedicarboxylic; 1,4-cyclohexanedicarboxylic; 1,4-cyclohexenedicarboxylic; phthalic; terephthalic; isophthalic; 4-methylisophthalic; t-butyl isophthalic; 2,5-norbornane dicarboxylic; 1,4-naphthalic; diphenic; 4,4'-oxydibenzoic; 4,4'-methylenedibenzoic; diglycolic; thiodipropionic; 4,4'-sulfonyldibenzoic; 2,5-naphthalene dicarboxylic; 2,6-naphthalene dicarboxylic; and 2,7-naphthalene dicarboxylic acids. It will be understood that the corresponding esters of these acids are included in the term "dicarboxylic acid." Examples of these esters include dimethyl 1,4-cyclohexanedicarboxylate; dimethyl 2,6-naphthalenedicarboxylate; dimethyl 4,4'-sulfonyldibenzoate; dimethyl isophthalate; dimethyl terephthalate; and diphenyl terephthalate. Copolyesters may be prepared using two or more of the above dicarboxylic acids or esters thereof. Other derivatives (e.g., the acid chlorides and anhydrides) may also be used to prepare these polyesters.

Suitable diols for preparing these polyesters are aliphatic, alicyclic, and aromatic diols. Examples of such diols include ethylene glycol; diethylene glycol; 1,2-propylene glycol; 2,4-dimethyl-2-ethylhexane-1,3-diol; 2,2,4-trimethyl-1,3-pentanediol; 2,2 - dimethyl-1,3-propanediol;

2-ethyl-2-butyl-1,3-propanediol; 2,2 - diethyl-1,3-propanediol; 2-methyl-2-propyl-1,3-propanediol; 3-ethyl-2-isobutyl-1,3-propanediol; 1,3-butanediol; 1,4-butanediol; 1,4-butenediol; 1,5-pentanediol; 1,6-hexanediol; 1,10-decanediol; 2,2,4-trimethyl-1,6-hexanediol; 1,4-cyclohexanediol; 1,2 - cyclohexanedimethanol; 1,3-cyclohexanedimethanol; 1,4-cyclohexanedimethanol; 2,2,4,4-tetramethyl-1,3-cyclobutanediol; o-, m-, and p-xylylene diols; 4,4′-thiodiphenol; 4,4′ - methylenediphenol; 4,4′-dihydroxybiphenyl; hydroquinone; resorcinol; 4,4′ - sulfonyldiphenol; 4,4′ - oxydiphenol; 4,4-isopropylidenediphenol; 4,4′-isopropylidenebis(2,6 - dichlorophenol); 4,4′ - cyclohexylidenediphenol; 4,4′-(2 - norbornylidene)diphenol; 4,4′ - (hexahydro-4,7-methanoindan-5-ylidene)diphenol; 2,5 - naphthalenediol; and 2,5-norbornanediol. Copolyesters may be prepared using two or more of the above diols. Other dihydric phenols listed in U.S. Patents 3,030,335 and 3,317,466 may be used.

The preparation of these polyesters, as well as the manufacture of fibers and films therefrom, are accomplished according to methods well-known in the art. Therefore, these various methods need not be detailed herein.

The chlorination reaction of this invention may be illustrated as follows:

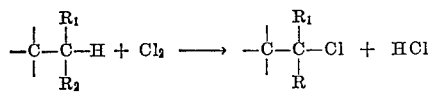

wherein $R_1$ and $R_2$ may be hydrogen or carbon. If a —$CH_2$— group in the polymer chain or in an alicyclic ring in the polymer is being chlorinated, then $R_1$ is hydrogen and $R_2$ is carbon, or vice versa.

The chlorination reaction is a free-radical reaction. Formation of the chlorine free radicals to initiate the reaction may be accomplished with visible or ultraviolet radiation, heat, a free radical catalyst, or a combination of these.

The polyester fibers and films may be chlorinated simply by contacting them with gaseous chlorine in the presence of visible radiation, ultraviolet radiation, and/or heat for a sufficient time for the desired degree of chlorination to be attained. A more rapid process is to immerse the fibers and films in water and pass in chlorine while the mixture is heated and/or irradiated with visible or ultraviolet radiation. Instead of water, an organic solvent may be used which will not substantially affect the physical properties of the fibers or films other than to cause slight swelling. The type of solvent which may be used depends upon the polymer structure. In general, suitable organic solvents include carbon tetrachloride, benzene, and chlorobenzene.

The chlorination reactions may be carried out at room temperature if the reaction mixtures are irradiated with visible or ultraviolet radiation. A more rapid reaction occurs if the mixture is also heated. Temperatures up to 150° C. may be used, depending upon the stability of the polymer, but temperatures of 80° to 120° C. are preferred. The reaction mixture may be heated without illumination with visible or ultraviolet radiation, but a longer reaction time is required.

When the chlorination is carried out in a liquid medium, the reaction may be initiated by use of a free radical catalyst instead of, or in addition to, heat or illumination. Since the catalyst initiates the free radical reaction by first dissociating into free radicals itself, the catalyst which is used depends upon the reaction temperature, which must be sufficiently high to cause dissociation at a reasonable rate. Examples of suitable free radical catalysts include acetyl peroxide, benzoyl peroxide, lauroyl peroxide, azobisisobutyronitrile, t-butylperoxypivalate, di-isopropylperoxydicarbonate, hydrogen peroxide, the alkali metal persulfates, and t-butylperoxide.

At the conclusion of the chlorination, the polyester fibers or films may be rinsed with water or an organic solvent and dried, or they may be only heated in order to remove liquid and gaseous components from the chlorination reaction.

Chlorine is the preferred chlorinating agent, but others may be used under the above reaction conditions in either an aqueous medium, or in organic solvents. Examples of other effective chlorinating agents includes sulfuryl chloride, phosphorus pentachloride, t-butyl hypochlorite, sodium hypochlorite, potassium hypochlorite, and hypochlorous acid. Bromination of the polyester surface also imparts flame-retardant characteristics and less bromine is required to accomplish this than chlorine, but chlorine is more reactive and is preferred.

The amount of chlorine which must be substituted on the surface of a fiber, fabric, film, or coating in order to make it self-extinguishing depends upon the structure of the polyester and the thickness of the film or the denier of the fiber. The thicker films and higher denier fibers require more chlorine to make them self-extinguishing than the thinner films and lower denier fibers. In general, polyester films one to three mils in thickness and three-denier polyester fibers become self-extinguishing when they contain about three to five percent chlorine, attached substantially on the surface, and they have improved resistance to burning when they contain at least about two percent chlorine. If 0.5 to 10 weight percent and preferably about 3 weight percent of an antimony compound (e.g., antimony trioxide, antimony chloride, and antimony oxychloride) is incorporated in the film or fiber, less chlorine is required in order for the fiber or film to have improved resistance to burning or to be self-extinguishing.

It is surprising not only that so little chlorine is required to make a fiber or film more resistant to burning, but also that the chlorination reaction itself even takes place to an appreciable degree between a solid polyester surface and chlorine in a gaseous or liquid medium. Drafted, heat-set poly(cyclohexylenedimethylene terephthalate) fibers are very crystalline and high melting, but 8.6 percent chlorine is substituted on the fabric during six hours at 30° C. in the presence of visible ullumination. Under the same reaction conditions, 1.1 percent chlorine is substituted on poly(ethylene terephthalate) fabric.

The polyester fibers and films which are chlorinated according to this invention may contain various additives, such as pigments, antioxidants, and stabilizers. Examples of effective stabilizers include organo-tin sulfur, organo-tin, epoxy, aziridinyl, urea phosphite, and unsaturated aliphatic compounds; powdered calcium carbonate; and fatty acid salts of metals, such as cadmium, zinc, and tin.

This invention will be further illustrated by the following examples of preferred embodiments, although it will be understood that these examples are included merely for purposes of illustration and are not intended to limit the scope of the invention.

In these examples, all fibers and fabrics are first washed with diethyl ether or an aqueous detergent solution to remove any lubricants which may be present. All films are about one to three mils in thickness and fibers (staple or continuous filament) are about three to six denier/filament, unless otherwise indicated. All films and fibers are strong and tough after the chlorinations, but most of the films become hazy or opaque white during the reaction. The term "self-extinguishing" indicates that the sample stops burning within a few seconds after removal of a Bunsen burner flame; in most examples this occurs immediately upon removal of the flame. All unchlorinated samples burn readily.

Example 1

Various polymer specimens (listed below), including fibers and three-inch squares of fabrics and films are immersed together in 1.5 l. of water in a 3-l. flask, irradiated with a 300-watt lamp (visible radiation), and slowly stirred while chlorine gas is slowly bubbled in for six hours. The water is held at 30° C. by slight cooling with a water bath, which offsets the heating effect of the lamp. At the end of the chlorination period the specimens are thoroughly washed with water and dried. The chlorine analysis and flammability of each sample are listed below. All ratios are molar, and all percentages are given in weights as based on the weight of the fiber or film.

(A) Fabric of drafted, heat-set, spun yarn of poly (ethylene terephthalate); 1.1 percent Cl; burns.

(B) Film of biaxially oriented, heat-set poly(ethylene terephthalate); 0.2 percent Cl; burns.

(C) Fabric of drafted, heat-set, spun yarn of the polyester of terephthalic acid and 1,4-cyclohexanedimethanol; 8.6 percent Cl; self-extinguishing.

(D) Film, cast from chloroform, of the polyester of 50/50 terephthalic acid/isophthalic acid and 1,4-cyclohexanedimethanol; 4.4 percent Cl; self-extinguishing.

(E) Film, cast from methylene chloride, of the polycarbonate of 4,4'-isopropylidenediphenol and phosgene; 4.5 percent Cl; self-extinguishing.

(F) Wet-spun fibers of the polycarbonate of 4,4'-(2-norbornylidene)diphenol and phosgene; 5.8 percent Cl; self-extinguishing.

(G) Film, cast from 80/20 methylene chloride/trifluoroacetic acid, of the polyester of terephthalic acid and 2,2,4,4-tetramethyl-1,3-cyclobutanediol; 4.9 percent Cl; self-extinguishing.

(H) Film, cast from methylene chloride, of the polyester of 50/50 azelaic acid/trans-1,4-cyclohexanedicarboxylic acid and 4,4'-(hexahydro-4,7-methanoindan-5-ylidene)diphenol; 7.3 percent Cl; self-extinguishing.

(I) Pressed film of the polyester of 4,4'-sulfonyldibenzoic acid and 1,10-decanediol; 3.9 percent Cl; self-extinguishing.

Examples 1A and 1B show the difficulty in chlorinating poly(ethylene terephthalate) to a sufficient degree to give self-extinguishing products.

In the above examples similar results are obtained when a 275-watt ultraviolet lamp is used instead of the 300-watt visible lamp. Considerably less chlorination occurs at this temperature (30° C.) when no illumination is used.

Example 2

The results obtained from the chlorination of fabrics by the method of Example 1 but at 70° C. for one hour are listed below.

(A) Fabrics of drafted, heat-set, spun yarn (three denier per filament) of poly(ethylene terephthalate); 0.4 percent Cl; burns.

(B) Fabrics of drafted, heat-set, spun yarn (three denier per filament) of poly(1,4-cyclohexyldimethylene terephthalate); 6.2 percent Cl; self-extinguishing.

Even after a chlorination period of three hours at 80° C. the poly(ethylene terephthalate) fabric contains only 2.2 percent chlorine and burns.

Example 3

Chlorobenzene at 110° C. instead of water at 70° C. is used in the procedure of Example 2 (visible radiation). The poly(ethylene terephthalic) fabrics contain only 0.7 percent chlorine after one hour and 1.5 percent after two hours and burn. In contrast, the poly(1,4-cyclohexylmethylene terephthalate) fabrics contain 6.1 percent chlorine after only 15 minutes and 8.6 percent after 30 minutes in the chlorobenzene solution without any radiation and are self-extinguishing. When 1.5 grams of benzoyl peroxide is also present in the chlorobenzene (1.5 l.), the latter fabrics contain 10.2 percent chlorine after a 30-minute chlorination period. When the reaction mixture is also illuminated with the 300-watt visible lamp, the latter fabrics contain 11.1 percent chlorine.

Example 4

Poly(1,4 - cyclohexylenedimethylene terephthalate) staple (three denier per filament) is chlorinated in an autoclave. Two grams of staple is placed in a 100-cc. autoclave, which is evacuated and released to chlorine. The temperature is increased to 100° C. during one hour (exothermic reaction) and held at 100° C. an additional hour under a chlorine pressure of 15 p.s.i. The staple is then heated at 90° C. under reduced pressure to remove all chlorine gas and hydrogen chloride adhering to the staple. The product contains 7.7 percent chlorine and is self-extinguishing.

Example 5

The following films are chlorinated in water by the procedure of Example 1 but at 90° C. for two hours. All are self-extinguishing after the treatment; chlorine analyses are listed.

(A) Two-mil film of the biaxially oriented, heat-set polyester of 83/17 terephthalic acid/isophthalic acid and 1,4-cyclohexanedimethanol; 10.7 percent Cl.

(B) Three-mil film, cast from methylene chlorine, of the polycarbonate of 4,4'-(2-norbornylidene)diphenol and phosgene; 5.8 percent Cl.

(C) One and five-tenths-mil film, cast from methylene chloride, of the polycarbonate of 4,4'-isopropylidenediphenol and phosgene; 2.8 percent Cl.

(D) One-mil film, cast from chloroform, of the polycarbonate of 2,2,4,4-tetramethyl-1,3-cyclobutanediol and phosgene; 23.4 percent Cl.

(E) One and five-tenths-mil film, cast from chloroform, of the polyester of 50/50 terephthalic acid/isophthalic acid and 4,4'-isopropylidenediphenol; 3.5 percent Cl.

(F) One-mil film, cast from chloroform, of the polyester of 50/50 terephthalic acid/isophthalic acid and 4,4'-(2-norbornylidene)diphenol; 12.0 percent Cl.

(G) One and five-tenths-mil film, cast from chloroform, of the polyester of 80/20 terephthalic acid/sebacic acid and 2,2,4,4-tetramethyl-1,3-cyclobutanediol; 14.5 percent Cl.

(H) Pressed three-mil film of the polyester of terephthalic acid and 50/50 1,4-cyclohexanedimethanol/neopentyl glycol; 6.8 percent Cl.

(I) Pressed four-mil film of the polyester of terephthalic acid and 1,3-cyclopentanedimethanol; 4.9 percent Cl.

(J) Pressed three-mil film of the polyester of isophthalic acid and trans-1,4-cyclohexanediol; 6.1 percent Cl.

When the above films are chlorinated for a shorter period of time (one hour instead of two hours), they contain less chlorine and are still self-extinguishing or shown improved resistance to burning, compared to the unchlorinated controls which all burn readily.

Example 6

Drafted, heat-set fibers (coils containing about four feet of monofilament) of the following polyesters are chlorinated in water by the procedure of Example 1 but at 90° C. for three hours. All are self-extinguishing after the treatment unless otherwise indicated. The fiber deniers are listed since some are greater than the three to six denier per filament fibers listed in earlier examples.

(A) Polypivalolactone, three denier per filament, 4.9 percent Cl.

(B) Copolymer of 88/12 pivalolactone/2-butyl-2-ethylpropiolactone, three denier per filament, 5.4 percent Cl.

(C) Polyester of 4,4'-sulfonyldibenzoic acid and 1,5-pentanediol, two denier per filament, 8.5 percent Cl.

(D) Polyester of terephthalic acid and 80/20 ethylene glycol/1,4-cyclohexanedimethanol, five denier per filament, 6.1 percent Cl.

(E) Blend prepared by mixing 80 weight percent of poly(ethylene terephthalate) particles and 20 weight percent poly(1,4-cyclohexylenedimethylene terephthalate)

particles (20-mesh) and melt spinning, drafting, and heat-setting. Eight and seven-tenths denier per filament, 6.0 percent Cl.

(F) Polyester of 2,6-naphthalenedicarboxylic acid and 1,4-cyclohexanedimethanol, five denier per filament, 5.9 percent Cl.

(G) Polycarbonate of 4,4'-isopropylidenediphenol and phosgene, 10.5 denier per filament, 5.0 percent Cl.

(H) Polycarbonate of 4,4'-(hexahydro-4,7-methanoindan-5-ylidene)diphenol and phosgene, 9.5 denier per filament, 14.5 percent Cl.

(I) Poly(1,4-cyclohexylenedimethylene terephthalate), 15 denier per filament, 6.7 percent Cl.

(J) Poly(1,4-cyclohexylenedimethylene terephthalate) containing three percent antimony trioxide, 17 denier per filament, 4.5 percent Cl.

Example 7

This example shows the effect of chlorination on the physical properties of poly(1,4-cyclohexylenedimethylene terephthalate) fabric. The unchlorinated fabric, prepared from spun yarn of three denier per filament staple, has the following tensile properties (five-inch gauge length strips raveled to one inch in width): tenacity 1.9 grams/denier, elongation 32 percent. Fabric containing 7.8 percent chlorine (from chlorination in water at 90° C.) has the following properties: tenacity 1.6 grams/denier, elongation 25 percent. After this fabric is heated for 15 minutes at 180° C., it contains 6.5 percent chlorine and has the following properties: tenacity 1.4 grams/denier, elongation 28 percent. The latter results show the surprising thermal stability of the chlorinated fabric.

Example 8

Poly(1,4 - cyclohexylenedimethylene terephthalate) staple (three denier per filament) is immersed in a solution consisting of 250 grams of aqueous sodium hypochlorite (five percent available chlorine) which has been acidified with 21 grams of acetic acid. The mixture is heated to 90° C. for 30 minutes, then cooled, and the chlorinated staple is thoroughly washed with water and dried. It contains 9.2 percent chlorine and is self-extinguishing.

This reaction is carried out on a larger scale with 20 pounds of staple. The chlorinated staple is spun into yarn and woven into fabric. The fabrics are self-extinguishing.

The invention has been described in detail with particular reference to preferred embodiments thereof, but it will be understood that variations and modifications can be effected within the spirit and scope of the invention as described hereinabove and as defined in the appended claims.

We claim:
1. A chlorinated fiber or film produced by a process which comprises contacting, at a temperature between about room temperature and about 150° C., a fiber or film consisting essentially of a highly polymeric, linear polyester derived from (A) carbonic acid, a bifunctional hydroxycarboxylic acid, or a bifunctional dicarboxylic acid and (B) a bifunctional diol, with a chlorinating agent in the presence of a chlorination promoter, whereby the surface of said fiber or film is chlorinated, the amount of chlorine being from about two to about twenty-five percent of the weight of said fiber or film and the chlorine being attached to non-aromatic carbon atoms which are attached only to carbon or hydrogen atoms.

2. A fiber or film as defined by claim 1 wherein (A) is terephthalic acid and (B) is 1,4-cyclohexanedimethanol.

3. A fiber or film as defined by claim 1 wherein up to 50 mole percent of (A) is isophthalic acid and from 50 to 100 mole percent of (A) is terephthalic acid.

4. A fiber or film as defined by claim 1 wherein (A) is an equimolar mixture of terephthalic and isophthalic acids and (B) is 1,4-cyclohexanedimethanol.

5. A fiber or film as defined by claim 1 wherein (A) is carbonic acid and (B) is 4,4'-isopropylidenediphenol.

6. A fiber or film as defined by claim 1 wherein (A) is carbonic acid and (B) is 4,4'-(2-norbornylidene)diphenol.

7. A fiber or film as defined by claim 1 wherein (A) is terephthalic acid and (B) is 2,2,4,4-tetramethyl-1,3-cyclobutanediol.

8. A fiber or film as defined by claim 1 wherein (A) is carbonic acid and (B) is 2,2,4,4-tetramethyl-1,3-cyclobutanediol.

9. A fiber or film as defined by claim 1 wherein (A) is an equimolar mixture of terephthalic and isophthalic acids and (B) is 4,4'-isopropylidenediphenol.

10. A fiber or film as defined by claim 1 wherein (A) is carbonic acid and (B) is 4,4'-(hexahydro-4,7-methanoindan-5-ylidene)diphenol.

11. A fiber or film as defined by claim 1 wherein (A) is an equimolar mixture of terephthalic and isophthalic acids and (B) is 4,4'-(2-norbornylidene)diphenol.

12. A fiber or film as defined by claim 1 wherein (A) is terephthalic acid and (B) consists of 80 mole percent of ethylene glycol and 20 mole percent of 1,4-cyclohexanedimethanol.

13. A fiber or film as defined by claim 1 wherein said polyester is a blend consisting of 80 weight percent of poly(ethylene terephthalate) and 20 weight percent of poly(1,4-cyclohexylenedimethylene terephthalate).

14. A fiber or film as defined by claim 1 wherein said polyester is polypivalolactone.

References Cited

UNITED STATES PATENTS

| | | | |
|---|---|---|---|
| 2,829,070 | 4/1958 | Osborn | 260—75 |
| 2,981,754 | 4/1961 | Wynn | 260—75 |
| 3,001,921 | 9/1961 | Pennino | 204—159.18 |
| 3,062,781 | 11/1962 | Bottenbruch | 260—47 |
| 3,331,890 | 7/1967 | Caldwell et al. | 260—860 |

MURRAY TILLMAN, *Primary Examiner.*

JOHN T. GOOLKASIAN, *Assistant Examiner.*

U.S. Cl. X.R.

8—115.5; 117—136; 204—159.18; 260—47, 75, 78.3; 264—340